US005909203A

United States Patent [19]
Browning et al.

[11] Patent Number: 5,909,203
[45] Date of Patent: Jun. 1, 1999

[54] ARCHITECTURE FOR ISOLATING DISPLAY GRIDS IN A FIELD EMISSION DISPLAY

[75] Inventors: Jim J. Browning, Boise; John K. Lee, Meridian; Tyler A. Lowrey, Boise, all of Id.

[73] Assignee: Micron Technology, Inc., Boise, Id.

[21] Appl. No.: 08/957,693

[22] Filed: Oct. 24, 1997

Related U.S. Application Data

[63] Continuation of application No. 08/543,739, Oct. 16, 1995, Pat. No. 5,754,149, which is a continuation of application No. 08/307,090, Sep. 16, 1994, Pat. No. 5,459,480, which is a continuation of application No. 08/089,212, Jul. 8, 1993, abandoned.

[51] Int. Cl.⁶ ......................................................... G09G 3/10
[52] U.S. Cl. ............................. 345/75; 315/349; 313/309
[58] Field of Search ........................ 345/74, 75; 313/309, 313/336, 351, 495; 315/349, 169.1, 169.3

[56] References Cited

U.S. PATENT DOCUMENTS

| | | | |
|---|---|---|---|
| 4,780,684 | 10/1988 | Kosmahl | 313/309 |
| 4,874,981 | 10/1989 | Spindt | 313/309 |
| 4,908,539 | 3/1990 | Meyer | 315/169.1 X |
| 4,983,878 | 1/1991 | Lee et al. | 313/309 X |
| 5,194,780 | 3/1993 | Meyer | 313/309 X |
| 5,210,472 | 5/1993 | Casper et al. | 315/349 |
| 5,329,237 | 7/1994 | Horch | 324/501 |
| 5,357,172 | 10/1994 | Lee et al. | 315/167 |
| 5,396,150 | 3/1995 | Wu et al. | 313/495 |
| 5,459,480 | 10/1995 | Browning et al. | 345/75 |
| 5,721,472 | 2/1998 | Browning et al. | 315/169.1 |

*Primary Examiner*—Amare Mengistu
*Attorney, Agent, or Firm*—William R. Bachand; Robert J. Stern

[57] ABSTRACT

The present invention teaches a field emission display ("FED") architecture for isolating display grids, wherein an FED has a plurality of pixels. Each of the pixels comprise at least two field emitter tips for displaying information to the pixel and a pixelator for driving the field emitter tips. Further, an isolated display grid is incorporated for each of the field emitter tips. Each display grids is coupled to a bus having a predetermined voltage by a link. In one embodiment of the present invention, the link can be disintegrated by internal or external means. In a second embodiment, the FED comprises a first and second bus, each of bus having a predetermined voltage, whereby a first isolated display grid is coupled to the first bus by a first link and a second isolated display grids is coupled to the second bus by a second link.

19 Claims, 3 Drawing Sheets

ARCHITECTURE FOR ISOLATING DISPLAY GRIDS IN A FIELD EMISSION DISPLAY

CROSS REFERENCE TO RELATED APPLICATIONS

This application is a continuation of U.S. patent application Ser. No. 08/543,739 filed Oct. 16, 1995, now U.S. Pat. No. 5,754,149; which is a continuation of application Ser. No. 08/307,090 filed Sep. 16, 1994, now U.S. Pat. No. 5,459,480; which is a continuation of application Ser. No. 08/089,212 filed Jul. 8, 1993, now abandoned.

FIELD OF THE INVENTION

The present invention relates to Field Emission Displays (FEDs), and more particularly, an architecture for isolating display grids in an FED.

BACKGROUND OF THE INVENTION

Until recently, the cathode ray tube ("CRT") has been the primary device for displaying information. While having sufficient display characteristics with respect to color, brightness, contrast and resolution, CRTs are relatively bulky and power hungry. In view of the advent of portable laptop computers, the demand has intensified for a display technology which is lightweight, compact, and power efficient.

One available technology is flat panel displays, and more particularly, Liquid Crystal Display ("LCD") devices. LCDs are currently used for laptop computers. However, these LCD devices provide poor contrast in comparison to CRT technology. Further, LCDs offer only a limited angular display range. Moreover, color LCD devices consume power at rates incompatible with extended battery operation. In addition, a color LCD type screen tends to be far more costly than an equivalent CRT.

In light of these shortcomings, there have been several developments recently in thin film, Field Emission Display ("FED") technology. In U.S. Pat. No. 5,210,472, commonly assigned with the present invention and incorporated herein by reference, a FED design is disclosed which utilizes a matrix-addressable array of pointed, thin-film, cold emission cathodes in combination with a phosphor luminescent screen. Here, the FED incorporates a column signal to activate a column switching driver and a row signal to activate a row switching driver. At the intersection of both an activated column and an activated row, a grid-to-emitter voltage differential exists sufficient to induce a field emission, thereby causing illumination of the associated phosphor of a pixel on the phosphorescent screen. By employing this design, the bus line associated with the current regulator has a low parasitic capacitance, thus being easier to control.

Extensive research has recently made the manufacture of an inexpensive, low power, high resolution, high contrast, full color FED a more feasible alternative to LCDs. However, in order to produce a high resolution FED, a greater number of pixels per unit of area measured—i.e., square inches—are required. Thus, resolution is inversely proportional to the number of field emitter tips per pixel. For example, while a lower resolution FED may comprise 1000 tips per pixel, a higher resolution FED will comprise 1, 2, 3 or 4 tips per pixel.

Several problems may arise where a number of field emitter tips relate to a single pixel. Referring to FIG. 1, an FED is illustrated having a four tip per pixel design. In this architecture, four emitter tips, 20, 20', 20", and 20'", are each coupled together at a common node 25. Emitter tips 20, 20', 20", and 20'" are additionally coupled through a singular grid 15 to form a singular pixel 10 on an FED 5. Further, a pixelator 30 is coupled between a drive resistor 35 and common node 25.

The problems associated with this architecture can best be viewed from a topographical perspective. Referring to FIG. 2, pixel is illustrated comprising field emitter tips 20, 20', 20", and 20'". Further, each tip, 20, 20', 20", and 20'" is positioned within the singular grid 15, which is coupled to a power bus 45 by means of a via or link 40. Given this structural configuration, should one emitter tip of tips 20, 20', 20", and 20'" be inoperative, the entire pixel 10 will fail. This can be realized because tips 20, 20', 20" and 20'" are each coupled to common node 25. Thus, should one tip electrically short, the remaining tips and the pixel as a whole will be inoperative as well. As there is no present design enabling the removal of the malfunctioning pixel, the entire FED, depending on the specifications, may be unusable. As such, the yield of an FED utilizing this design may be substantially impacted.

In light of these limitations, presently there is a need for an FED architecture which provides a means for decoupling a nonfunctional field emitter tip or tips. Ideally, this structural design must not increase manufacturing and labor costs. Thus, a circuit design solution incorporated into current FED is preferred.

SUMMARY OF THE INVENTION

In order to achieve the hereinabove advantage, as well as others which will become apparent hereafter, an architecture for isolating display grids in a field emission display having a plurality of pixels is disclosed. Each of the pixels comprise at least two field emitter tips for displaying information to the pixel and a pixelator for driving the field emitter tips. Further, an isolated display grid is incorporated for each of the field emitter tips or for a group of tips. Each display grid is coupled by a link to a bus having a predetermined voltage.

In one embodiment of the present invention, the link comprises a fusible region which disintegrates when a predetermined level of current is being driven by the pixelator to the tip. Nonetheless, an external means can also be employed to disintegrate the link.

In a second embodiment, the FED comprises a first and second bus, each bus having a predetermined voltage, whereby a first isolated display grid is coupled to the first bus by a first link and a second isolated display grid is coupled to the second bus by a second link.

Other aspects and advantages will become apparent to those skilled in the art from the following detailed description read in conjunction with the appended claims and the drawings attached hereto.

BRIEF DESCRIPTION OF THE DRAWINGS

The present invention will be better understood from reading the following description of non-limitative embodiments, with reference to the attached drawings, wherein below.

DETAILED DESCRIPTION OF THE INVENTION

Figure 1:
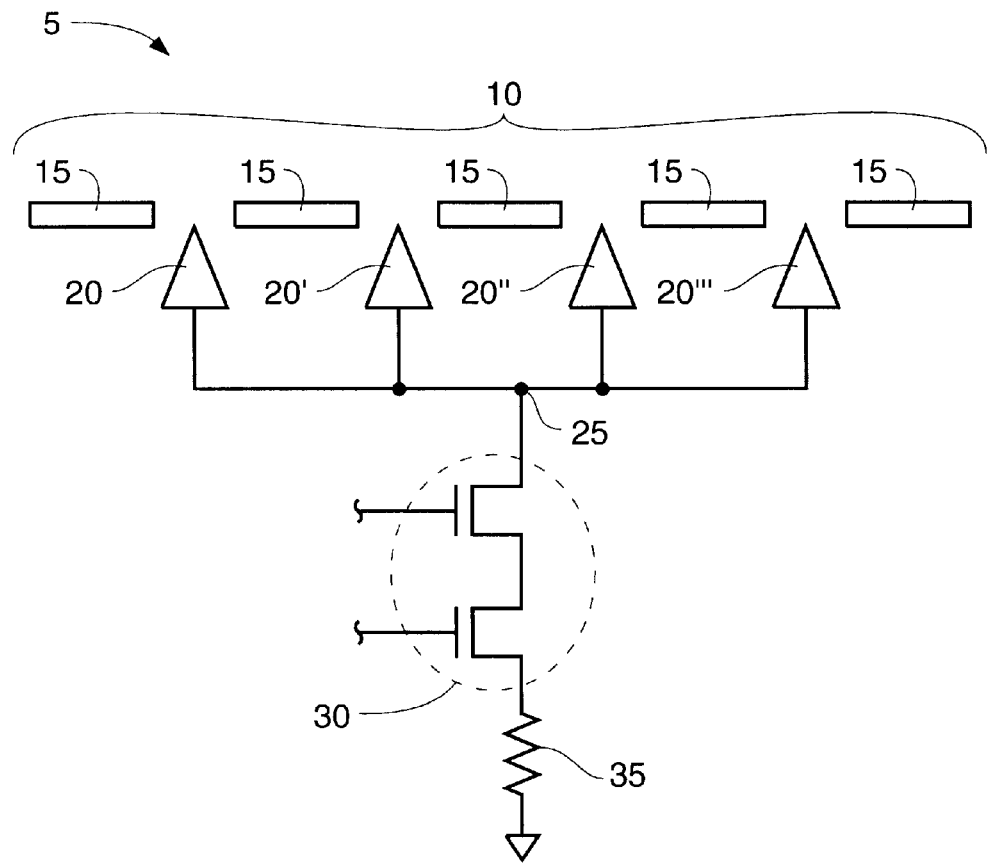
FIG. 1 is a schematic representation of a field emission display architecture.
Figure 2:
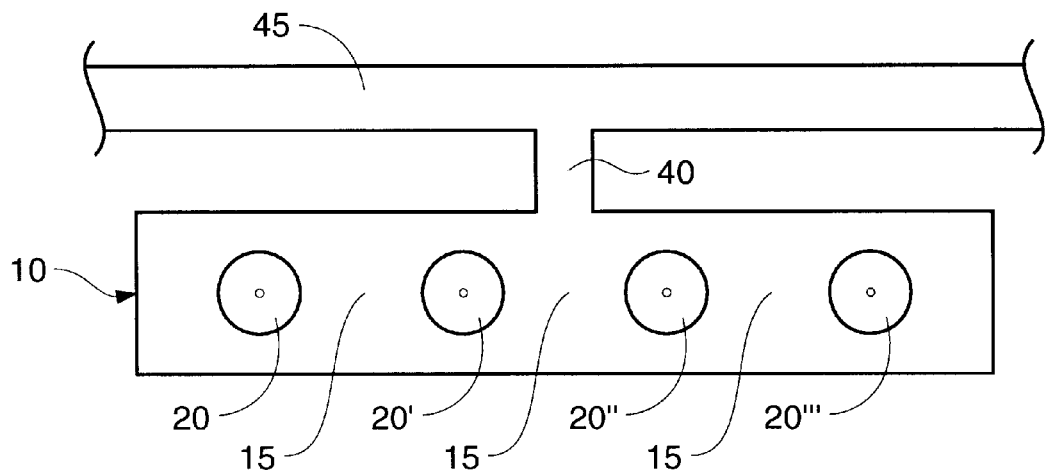
FIG. 2 is topographical perspective of the field emission display architecture.
Figure 3:
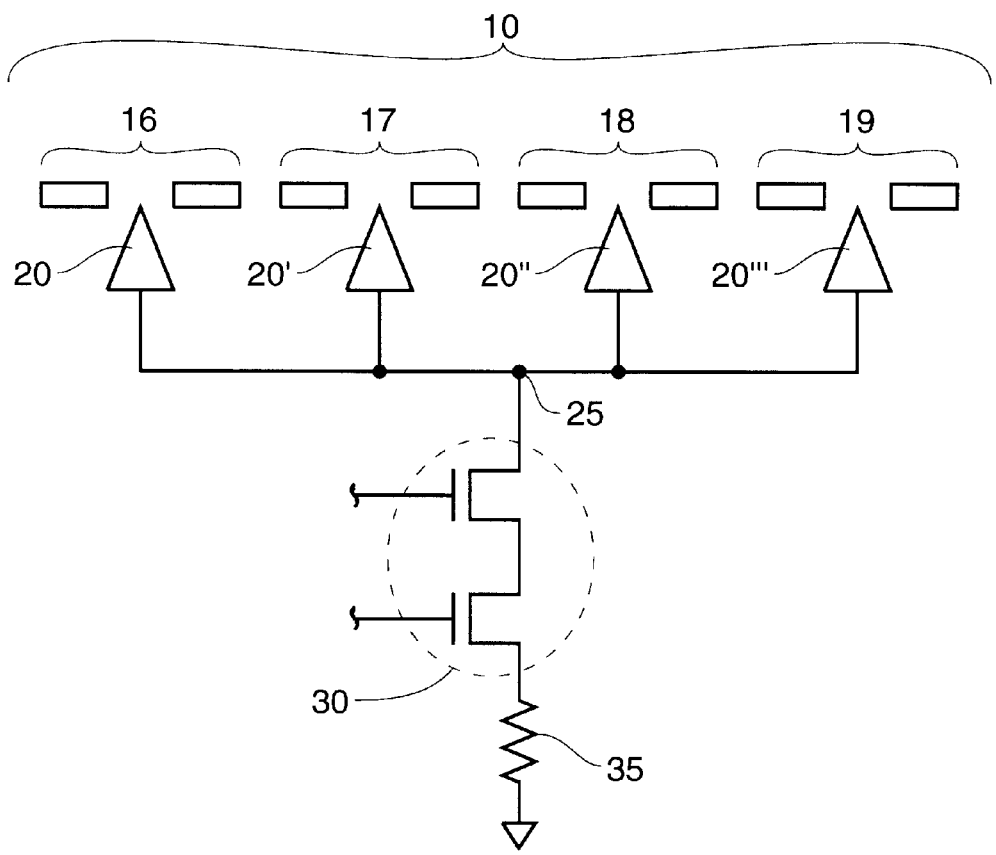
FIG. 3 is a schematic representation of the present invention.

Referring to FIG. 3, a schematic representation of the present invention is illustrated. A high resolution FED 5 is shown having a four tip per pixel design. It should be obvious to one of ordinary skill in the art that the present invention is applicable to any multiple tips per pixel design, and not simply the four tip per pixel arrangement described herein.

As a high resolution FED architecture, four emitter tips, 20, 20', 20", or 20'" are each coupled together at a common node 25. To properly drive each tip, 20, 20', 20", or 20'" a pixelator 30 is coupled between a drive resistor 35 and common node 25. However, in each pixel 10, unlike known high resolution FED designs, each of the emitter tips, 20, 20', 20", or 20'" are coupled through a singular isolated grid, 16, 17, 18 and 19.

Figure 4:
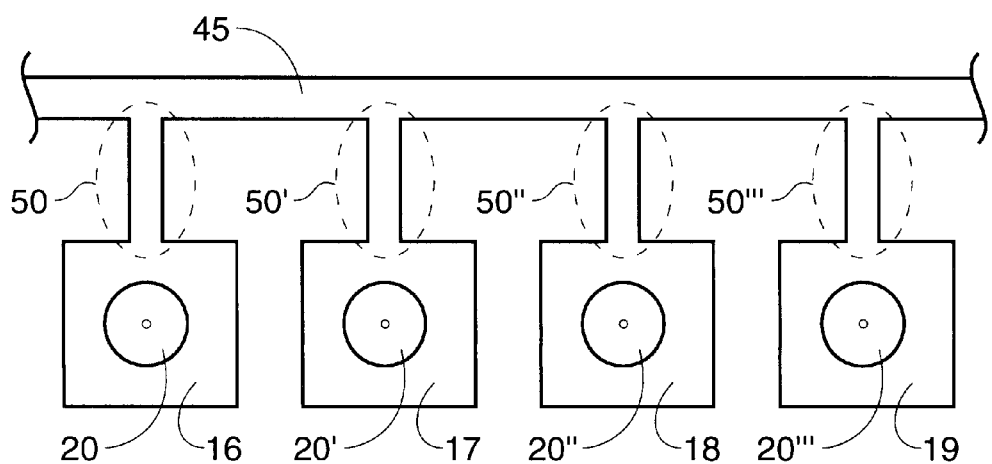
FIG. 4 is a topographical perspective of the present invention.

Referring to FIG. 4, a topographical perspective of the present invention is depicted. As described above, a one to one relationship exists between the number of emitter tips and the number of singular isolated grids. By this design, each singular isolated grid 16, 17, 18 and 19, is coupled, by means of a via or link, 50, 50', 50" and 50'", to a bus 45 having a predetermined voltage for the purposes of properly biasing each grid.

Relying on the structural configuration of FIGS. 3 and 4, the advantages of the present invention should become more evident. In the event one or more of emitter tips, 20, 20', 20", or 20'" should malfunction, the present invention enables the remaining functioning emitter tips to properly operate and facilitate further usage of the pixel. This is achieved by removing the malfunctioning tip through its associated link. Thus, in pixel 10, should emitter tip 20, 20', 20", or 20'" fail, the present invention provides means for decoupling the failed tips associated isolated grid, 50, 50', 50", or 50'" from bus 45. This condition is of particular significance when the failed tip ultimately causes the remaining tips to fail. This issue can arise when the tip fails because of a short. By removing the failed tip from the pixel, the remaining operating tips can provide sufficient current to enable the pixel to properly function. Thus, it should be noted that while lowering the resolution of pixel 10, this decoupling step enables the pixel to properly operate. Furthermore, by the disintegration of the link of a failed tip, the need to remove the otherwise failed pixel from the display itself is overcome.

Prior to disintegrating the link of a failed tip, each pixel must be properly tested to ascertain which tips of that pixel are properly functioning. Several means for evaluating the operability of each of the field emitter tips are available to properly test each pixel. In one embodiment of the present invention, the operability of each tip is made apparent by stressing the entire display or specific pixels. Tips which are inoperative emit infrared light after shorting as a result of stressing. Thus, by means of an infrared sensor, such as an emission microscope for multilevel inspection ("EMMI"), a failing emitter tip which has shorted can be detected. As such, utilizing an EMMI, the coordinates of an inoperative tip can be ascertained and stored to enable the subsequent disintegration of its associated link.

Further, upon stressing a pixel, a second phenomenon has been observed. The isolated display grid of a properly functioning tip comprises a negligible current to its associated bus. However, the isolated display grid of a failed tip generates a current substantially within the range of 100 nA and 10 $\mu$A. Given this event, in a second embodiment of the present invention, a failing emitter tip which has shorted can be detected, by means of a current sensor, whereby the coordinates of an inoperative tip can be ascertained and stored to enable the subsequent disintegration of its associated link.

The disintegration of the link associated with a failed tip can be achieved utilizing several methods. In one embodiment of the present invention, a system for decoupling each of the inoperable field emitter tips is disclosed. Being directly accessible to light emissions, the link associated with a failed tip can be disintegrated by directly exposing it to light emissions. These emissions should be generated by a laser, though other energy forms are also employable. The power necessary from a laser to sufficiently disintegrate the link through this approach is substantially in the range of 0.1 $\mu$Watt and 10 mWatt. However, there is a direct relationship between power and the dimensions of the links themselves. While a thicker link requires greater power, a thinner will require less power.

In an alternate embodiment of the present invention, the link associated with a failed tip can be dissolved by applying an acid etch. The acid employed should comprise $H_2SO_4$, $H_2SO_4$ and $H_2O_2$, or $H_2PO_4$, though other acids can also be used. However, when using acid, consideration must be given to the potential damage to the remainder of the chip. As such, only a limited amount of acid can be used. A special applicator may be required to allow for the application of the acid.

Figure 5:
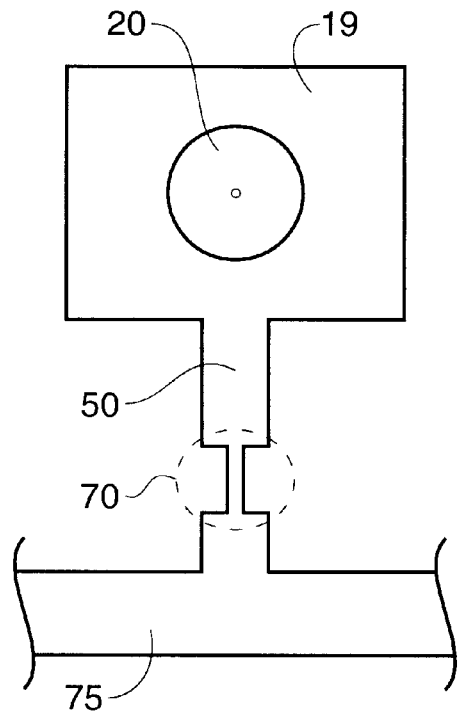
FIG. 5 is an alternate embodiment of the present invention.

In the preferred embodiment of the present invention, the link is directly disintegrated by relying on fuse-type technology. Referring to FIG. 5, a link 50 is shown coupling an isolated display grid 19 to a power bus 75. Link 50 comprises a fusible region 70 having predetermined dimensions. Fusible region 70 is incorporated in link 50 for the purpose of disintegrating the coupling between isolated display grid 19 and bus 75 when a predetermined level of current begins to pass. For example, the dimensions of region 70 can be calibrated to disintegrate when a short has formed in the associated emitter tip 19.

Figure 6:
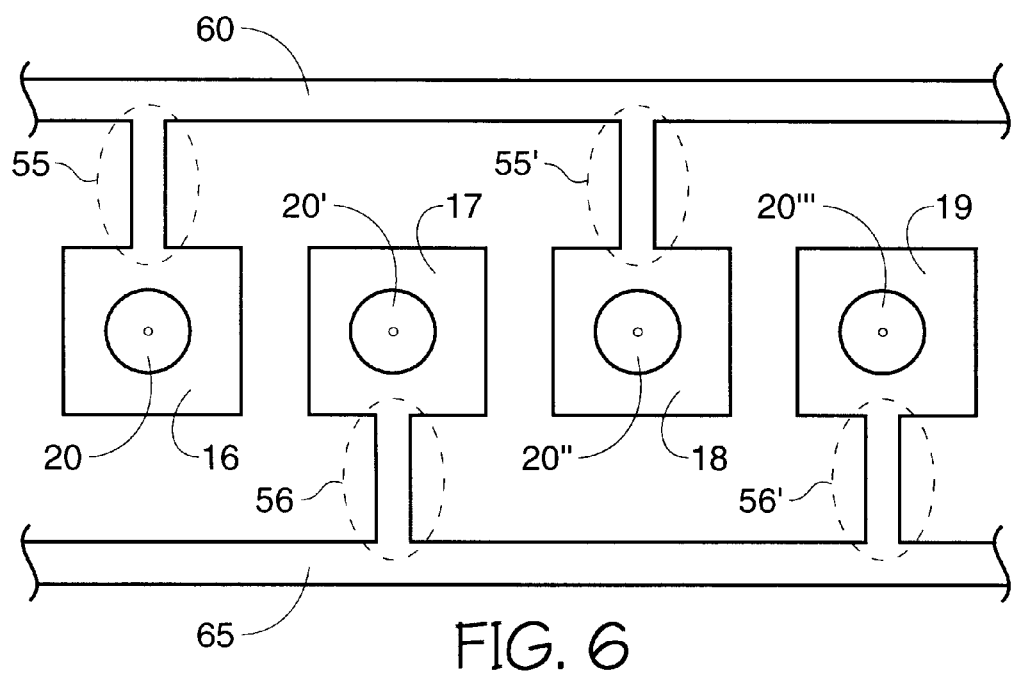
FIG. 6 is a further alternate embodiment of the present invention.

Referring to FIG. 6, still another embodiment of the present invention is illustrated from a topographical perspective. As described above, a one to one relationship exists between the number of emitter tips and the number of singular isolated grids. It should, however, be obvious to one of ordinary skill in the art that an architecture could be designed wherein a one to one relationship exists between the number of isolated display grids and the number of power buses. Thus, it is conceivable that, in a four tip per pixel arrangement, each of the four isolated display grids has its own power bus. Other relationships, such as varying the number of tips per isolated display grid, are similarly devisable.

Furthermore, isolated grids 16, 17, 18 and 19, are coupled into pairs of grids, wherein grid 16 and 18 form the first pair, and 17 and 19 form the second pair. Each pair of grids are then independently coupled to one of two power buses, 60 or 65, by means of a via or link, 55, 55', 56 and 56'. Both power buses, 60 and 65, have a predetermined voltage for the purposes of properly biasing each grid.

In the event one or more of emitter tips, 20, 20', 20", or 20'" should malfunction, this embodiment enables the remaining functioning emitter tips to properly operate and facilitate further usage of the pixel. This is achieved by removing the malfunctioning tip through its associated link. Thus, in pixel 10, should emitter tip 20, 20', 20" or 20'" fail, the present invention provides means for decoupling the failed tips from the pixel by disintegrating the relevant link. This condition is of particular significance when the failed tip ultimately causes the remaining tips to fail. This issue can arise when the tip fails because of a short. By removing the failed tip from the pixel, the remaining operating tips can provide sufficient energy to enable the pixel to properly function. Thus, it should be noted that while lowering the resolution of pixel 10, this decoupling step enables the pixel to properly operate. Furthermore, by the disintegration of the link of a failed tip, the need to remove the otherwise failed pixel from the display itself is overcome.

The structural configuration of FIG. 6 has several additional advantages. Firstly, by subdividing each pixel into two pairs of isolated display grids, identifying a malfunctioning tip within a pixel is simplified. By biasing only one power bus, a shorted tip can be detected. This is achieved by subsequently measuring the current flow through the bus and the shorted pixel. As the other power bus is disabled, this approach enables the determination of which pair of tips is shorted. While this technique can be used for more than two tips per pixel resolution, to directly identify a particular shorted tip, a one to one relationship is required between the number of isolated display grids and the number of buses.

Similarly, a method for decoupling inoperative field emitter tips can be formulated. Initially, a field emission display is provided having a plurality of pixels. Each of the pixels of the display comprises at least two field emitter tips for displaying information to the pixel, a pixelator for driving the field emitter tips, a bus having a predetermined voltage, and an isolated display grid for each of the field emitter tips. Each isolated display grid is coupled to the bus by a link.

Second, the step of testing each of the tips for operability is performed. This testing step involves the generation of a signal identifying which of the elements are inoperable. This step of testing can be achieved in one embodiment by sensing infrared energy emitted from each inoperative field emitter tip. Thus, by using an emission microscope for multilevel inspection ("EMMI"), those tips which are inoperable can be identified. In an alternate embodiment, the testing step can be achieved by sensing a current between said inoperative tip and said display grid.

Third, the step of decoupling each of the inoperable tips is performed. This is achieved by disintegrating the link between the isolated display and bus of the failed tip in response to the signal. In one embodiment, disintegrating the link is accomplished by exposing the link to external energy substantially in the range of 0.1 $\mu$Watt and 10 mWatt. This energy is generated by a laser. In a second embodiment, disintegration is achieved by exposing the link to an acid etch. The acid etch preferably comprises at least one of $H_2SO_4$, $H_2SO_4$ diluted with $H_2O_2$, and $H_3PO_4$, though other acids may also be suitable.

While the particular invention has been described with reference to illustrative embodiments, this description is not meant to be construed in a limiting sense. It is understood that although the present invention has been described in a preferred embodiment, various modifications of the illustrative embodiments, as well as additional embodiments of the invention, will be apparent to persons skilled in the art upon reference to this description without departing from the spirit of the invention, as recited in the claims appended hereto. For example, it should be obvious to one of ordinary skill in the art that the ratio of tips per isolated display grid could be increased to greater than one to one. It is therefore contemplated that the appended claims will cover any such modifications or embodiments as fall within the true scope of the invention.

All of the U.S. Patents cited herein are hereby incorporated by reference as if set forth in their entirety.

What is claimed is:

1. A method of identifying shorted emitter tips in a field emission display, comprising the steps of:

providing a field emission display having a plurality of pixels;

providing in each pixel a plurality of grid electrodes and a plurality of field emitter tips;

in each pixel, positioning each emitter tip of the pixel adjacent to an associated one of the grid electrodes of the pixel;

providing in each pixel a number of removable links equal to the number of grid electrodes in the pixel, wherein each removable link includes a first end and a second end;

in each pixel, connecting the first end of each removable link of the pixel to a corresponding one of the grid electrodes of the pixel in a one-to-one correspondence between the grid electrodes of the pixel and the links of the pixel;

providing a plurality of power buses in the display;

in each pixel, connecting the second end of each link of the pixel to one of the power buses of the display, wherein at least two of the links in the pixel are connected to different ones of said power buses;

supplying a voltage to only one of the power buses; and while performing the step of supplying a voltage to only one power bus, measuring the electrical current flow through said one power bus.

2. A method according to claim 1, wherein:

the step of providing a plurality of grid electrodes comprises providing an equal number of grid electrodes in each pixel;

the step of providing a plurality of links comprises providing in each pixel a number of links equal to the number of grid electrodes in each pixel;

the step of providing a plurality of power buses comprises providing a number of power buses in the display equal to the number of links provided in each pixel; and the step of connecting the second end of each link to one of the power buses comprises, in each pixel, connecting the second end of each link in the pixel to a different one of the power buses in a one-to-one correspondence between the links in the pixel and the power buses in the display.

3. A method according to claim 1, wherein:

the step of providing a plurality of grid electrodes comprises providing a number "N" of grid electrodes in each pixel;

the step of providing a plurality of links comprises providing N links in each pixel;

the step of providing a plurality of power buses comprises providing N power buses in the display;

for each pixel, the step of connecting the first end of each link of the pixel to a corresponding one of the grid electrodes of the pixel comprises, for each integer "k" between 1 and N, inclusive, connecting the first end of the k-th link of the pixel to the k-th grid electrode of the pixel; and for each pixel, the step of connecting the second end of each link of the pixel to one of the power buses comprises, for each integer "k" between 1 and N, inclusive, connecting the k-th link of the pixel to the k-th power bus of the display.

4. A method of decoupling shorted emitter tips in a field emission display, comprising the steps of:

providing a field emission display having a plurality of pixels;

providing at least one power bus in the display;

providing in each pixel a number of grid electrodes and a number of field emitter tips;

in each pixel, positioning each emitter tip of the pixel adjacent to an associated one of the grid electrodes of the pixel;

providing in each pixel a number of removable links equal to the number of grid electrodes in the pixel, wherein each removable link includes a first end and a second end;

connecting the second end of each removable link to one of said at least one power buses;

in each pixel, connecting the first end of each removable link of the pixel to a corresponding one of the grid electrodes of the pixel in a one-to-one correspondence between the grid electrodes of the pixel and the links of the pixel; and if any pixel includes a shorted field emitter tip, removing the link connected to the grid electrode associated with the shorted emitter tip.

5. A method according to claim 4, wherein:

the step of providing in each pixel a number of grid electrodes and field emitter tips comprises providing in each pixel at least first and second distinct grid electrodes and at least first and second distinct field emitter tips; and the step of positioning each emitter tip comprises in each pixel, positioning the first field emitter tip of the pixel adjacent to the first grid electrode of the pixel, and in each pixel, positioning the second field emitter tip of the pixel adjacent to the second grid electrode of the pixel.

6. A method according to claim 5, wherein:

the step of providing in each pixel a number of grid electrodes and field emitter tips comprises providing a number of grid electrodes in each pixel equal to the number of emitter tips in the pixel; and the step of positioning each emitter tip comprises in each pixel, positioning each emitter tip adjacent to an associated grid electrode in a one-to-one correspondence between the grid electrodes of the pixel and the emitter tips of the pixel.

7. A method according to claim 4, wherein:

the step of providing at least one power bus comprises providing at least two power buses; and the step of connecting a second end of each link to one of the power buses comprises connecting at least two of the links in each pixel to different ones of the power buses.

8. A method according to claim 4, wherein the step of removing the link comprises disintegrating the link by irradiating the link with radiant energy.

9. A method according to claim 8, wherein the step of irradiating the link comprises irradiating the link with a laser beam.

10. A method according to claim 4, wherein the step of removing the link comprises etching away the link.

11. A method according to claim 4, wherein:

the step of providing the links comprises providing a fusible region in each link; and the step of removing the link comprises conducting sufficient electrical current through the link to disintegrate the fusible region of the link.

12. A method according to claim 4, further comprising the step of:

before performing the step of removing the link, identifying any shorted emitter tips by sensing light emissions from the shorted emitter tips.

13. A method according to claim 4, further comprising the step of:

before performing the step of removing the link, identifying any shorted emitter tips by sensing electrical current flow through the respective grid electrodes associated with the shorted emitter tips.

14. A field emission display comprising:

at least one power bus having a voltage thereon; and a plurality of pixels, wherein each pixel includes a number of grid electrodes, a number of field emitter tips, wherein each emitter tip of the pixel is positioned adjacent to, and is associated with, one of the grid electrodes of the pixel, a transistor circuit for supplying current to the field emitter tips of the pixel, and a number of removable links, the number of links in the pixel being equal to the number of grid electrodes in the pixel, wherein each link has a first end connected to a corresponding one of the grid electrodes of the pixel in a one-to-one correspondence between the grid electrodes of the pixel and the links of the pixel, and wherein each link has a second end connected to one of said at least one power buses.

15. A display according to claim 14, wherein:

the grid electrodes in each pixel include first and second distinct grid electrodes;

the field emitter tips in each pixel include first and second distinct field emitter tips;

in each pixel, the first field emitter tip of the pixel is positioned adjacent to and is associated with the first grid electrode of the pixel; and in each pixel, the second field emitter tip of the pixel is positioned adjacent to and is associated with the second grid electrode of the pixel.

16. A display according to claim 15, wherein:

in each pixel, the number of grid electrodes in the pixel equals the number of emitter tips in the pixel, and each grid electrode of the pixel is associated with exactly one emitter tip of the pixel in a one-to-one correspondence between the grid electrodes of the pixel and the emitter tips of the pixel.

17. A display according to claim 14, wherein:

said at least one power bus includes at least two power buses; and in each pixel, at least two of the links in the pixel are connected to different ones of said power buses.

18. A display according to claim 14, wherein each link comprises a fusible region which disintegrates when a predetermined level of current passes through the link.

19. A display according to claim 14, wherein each link comprises a fusible region which disintegrates when any emitter tip associated with the grid electrode connected to said link is shorted.

* * * * *